(12) United States Patent
Brown et al.

(10) Patent No.: US 7,652,832 B2
(45) Date of Patent: Jan. 26, 2010

(54) COLLIMATED OPTICAL SYSTEM WITH CLIP RING ECCENTRIC LOCKING MECHANISM

(75) Inventors: Rawlin Heath Brown, Roanoke, VA (US); Robert D. Klein, Fort Wayne, IN (US); Todd M. Neff, Roanoke, VA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 11/947,841

(22) Filed: Nov. 30, 2007

(65) Prior Publication Data

US 2009/0141371 A1 Jun. 4, 2009

(51) Int. Cl.
G02B 7/02 (2006.01)
(52) U.S. Cl. .................... 359/811; 359/819
(58) Field of Classification Search ......... 359/811–823, 359/409, 410, 411, 480, 481
See application file for complete search history.

(56) References Cited

U.S. PATENT DOCUMENTS

| | | | |
|---|---|---|---|
| 2,424,011 A | 7/1947 | Gramont | 359/249 |
| 2,861,484 A | 11/1958 | Rance | 359/813 |
| 3,713,725 A * | 1/1973 | Uesugi | 359/813 |
| 3,737,667 A | 6/1973 | Babb et al. | 250/214 LA |
| 4,669,833 A | 6/1987 | Mise | 359/420 |
| 4,723,075 A * | 2/1988 | German | 250/231.14 |
| 4,743,763 A | 5/1988 | Cutburth et al. | 250/213 |
| 5,223,974 A | 6/1993 | Phillips et al. | 359/641 |
| 5,604,630 A | 2/1997 | Palmer | 359/409 |
| 6,259,088 B1 | 7/2001 | Antesberger | 250/214 VT |
| 6,337,768 B1 | 1/2002 | Carmi et al. | 359/399 |
| 6,339,500 B1 | 1/2002 | Carmi et al. | 359/399 |
| 6,411,448 B2 | 6/2002 | Takanashi et al. | 359/822 |
| 6,456,497 B1 * | 9/2002 | Palmer | 361/752 |

(Continued)

OTHER PUBLICATIONS

International Search Report Appln. No. PCT/US2006/043373 dated Mar. 29, 2007.

(Continued)

Primary Examiner—Mohammed Hasan
(74) Attorney, Agent, or Firm—RatnerPrestia (57) ABSTRACT

An optical system includes a lens cell having a generally cylindrical lens cell body. The lens cell body has a lens cell central longitudinal axis and a lens cell optical axis eccentrically offset from the lens cell central longitudinal axis. A sleeve includes a generally cylindrical sleeve body having an outer surface with a first longitudinal axis and an inner surface with a second longitudinal axis eccentrically offset from the first longitudinal axis. The lens cell is inserted into the sleeve. A housing has a generally cylindrical body with the sleeve at least partially inserted into the housing. A clip is disposed about at least a portion of the circumference of the housing. The lens cell and the sleeve are rotated relative to each other and to the housing such that the lens cell optical axis is aligned in a desired location. After the lens cell optical axis is aligned in the desired location, the clip is releasably coupled to and inserted through the housing and into the sleeve to restrict rotation of the sleeve relative to the housing.

22 Claims, 9 Drawing Sheets

U.S. PATENT DOCUMENTS

| | | | |
|---|---|---|---|
| 6,687,053 B1* | 2/2004 | Holmes et al. | 359/411 |
| 6,717,754 B2 | 4/2004 | Hirunuma et al. | 359/811 |
| 7,397,617 B2 | 7/2008 | Floyd et al. | 359/811 |
| 2005/0128576 A1 | 6/2005 | Perger et al. | 359/412 |
| 2005/0189764 A1* | 9/2005 | Ono | 285/305 |
| 2007/0103796 A1* | 5/2007 | Floyd et al. | 359/811 |

OTHER PUBLICATIONS

Jacobs, A., Examiner at the European Patent Office. European Search Report and Office Action of EP08170090.8-1524, Collimated Optical System With Clip Ring Eccentric Lockin Mechanism, Mar. 13, 2009.

* cited by examiner

COLLIMATED OPTICAL SYSTEM WITH CLIP RING ECCENTRIC LOCKING MECHANISM

BACKGROUND OF THE INVENTION

In a vision-assisting device, such as a monocular, the device is collimated when the output optical axis matches the input optical axis such that the beam of light entering the device is parallel with the beam of light exiting the device. During manufacturing of the device, a technician typically aligns the optical axes through an iterative process that requires adjustment of the device, securement of the components of the device relative to one another, and determination of whether the device is satisfactorily collimated. If the device is not satisfactorily collimated, the technician must release some of the previously secured components of the device relative to one another and readjust the device. A need exists, therefore, to provide a monocular that includes a mechanism for securing and releasing the components to allow for adjustment of the components relative to each other in order to collimate the device.

SUMMARY OF THE INVENTION

Briefly, the present invention provides an optical system. The optical system comprises a lens cell having a generally cylindrical lens cell body and an optical lens system therein. The lens cell body has a lens cell central longitudinal axis and a lens cell optical axis eccentrically offset from the lens cell central longitudinal axis. A sleeve includes a generally cylindrical sleeve body having an outer surface with a first longitudinal axis and an inner surface with a second longitudinal axis eccentrically offset from the first longitudinal axis. The lens cell is inserted into the sleeve. A housing has a generally cylindrical body with the sleeve at least partially inserted into the housing. A clip is disposed about at least a portion of the circumference of the housing. The lens cell and the sleeve are rotated relative to each other and to the housing such that the lens cell optical axis is aligned in a desired location. After the lens cell optical axis is aligned in the desired location, the clip is releasably coupled to and inserted through the housing and into the sleeve to restrict rotation of the sleeve relative to the housing.

Additionally, the present invention further provides an optical system comprising an inner cell having an inner cell central longitudinal axis and an inner cell optical axis eccentrically offset from the inner cell central longitudinal axis and an outer cell having a generally cylindrical cell body. The cell body has an outer surface with a first longitudinal axis and an inner surface with a second longitudinal axis eccentrically offset from the first longitudinal axis. The inner cell is inserted into the outer cell. A housing having a generally cylindrical body defining a perimeter thereof, wherein the outer cell is at least partially inserted into the housing and a clip disposed about at least a portion of the perimeter of the housing are also provided. The inner cell and the outer cell are rotated relative to each other and to the housing such that the inner cell optical axis is aligned in a desired location, and wherein, after the inner cell optical axis is aligned in the desired location, the clip is releasably coupled and inserted through the housing and into the outer cell to restrict rotation of the outer cell relative to the housing.

Also, the present invention provides a method of manufacturing a collimated optical device comprising the steps of providing a lens cell having a generally cylindrical lens cell body, wherein the lens cell body has a lens cell central longitudinal axis and a lens cell optical axis, offset from the lens cell central longitudinal axis; inserting the lens cell into a sleeve, wherein the sleeve comprises a generally cylindrical sleeve body, wherein the sleeve body has an outer surface with a first longitudinal axis and an inner surface with a second longitudinal axis offset from the first longitudinal axis; inserting the sleeve at least partially into a housing, wherein the housing comprises a generally cylindrical housing body; independently rotating the sleeve and the lens cell relative to the housing until the lens cell optical axis is at a desired location; securing the sleeve and the lens cell to each other to restrict rotation of the sleeve relative to the lens cell; and coupling a clip to the housing, wherein the clip extends through the housing and engages the sleeve, thereby securing the sleeve to the housing to restrict rotation of the sleeve relative to the housing.

Further, the present invention provides a binocular comprising a frame and first and second monoculars having optical systems described above being separately releasably connected to the frame.

BRIEF DESCRIPTION OF THE FIGURES

The foregoing summary, as well as the following detailed description of exemplary embodiments of the invention, will be better understood when read in conjunction with the appended drawings, which are incorporated herein and constitute part of this specification. For the purposes of illustrating the invention, there are shown in the drawings exemplary embodiments. It should be understood, however, that the invention is not limited to the precise arrangements and instrumentalities shown. In the drawings, the same reference numerals are employed for designating the same elements throughout the several figures. In the drawings.

DETAILED DESCRIPTION OF THE INVENTION

Certain terminology is used herein for convenience only and is not to be taken as a limitation on the present invention. The terminology includes the words specifically mentioned, derivatives thereof and words of similar import. As used herein, the term "input" is defined to mean a direction farther from a user when the monocular is in a use position as described herein and "output" is defined to mean a direction closer to the user when the monocular is in a use position as described herein. The following describes exemplary embodiments of the invention. However, it should be understood based on this disclosure, that the invention is not limited by the exemplary embodiments of the invention.

Figure 1:
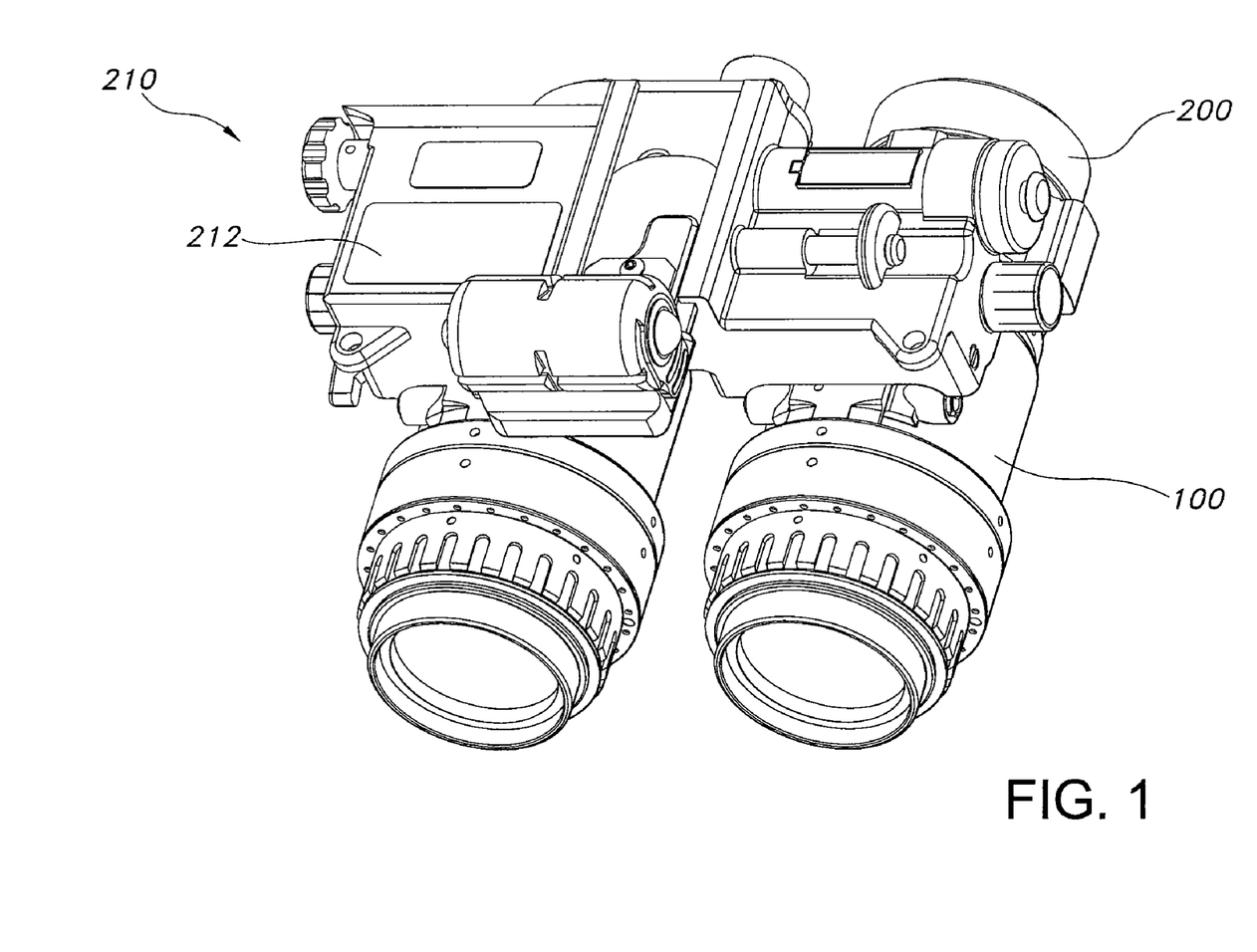
FIG. 1 is a perspective view of a binocular including a monocular according to an exemplary embodiment of the present invention.

Referring to the drawings generally, a monocular 100 according to an exemplary embodiment of the present invention is shown. The exemplary monocular 100 can be used as a monocular or can be part of a night vision goggle (NVG) binocular 210, shown in FIG. 1. These devices are used to intensify ambient or infrared light for enhanced visibility in a darkened environment.

Figure 2:
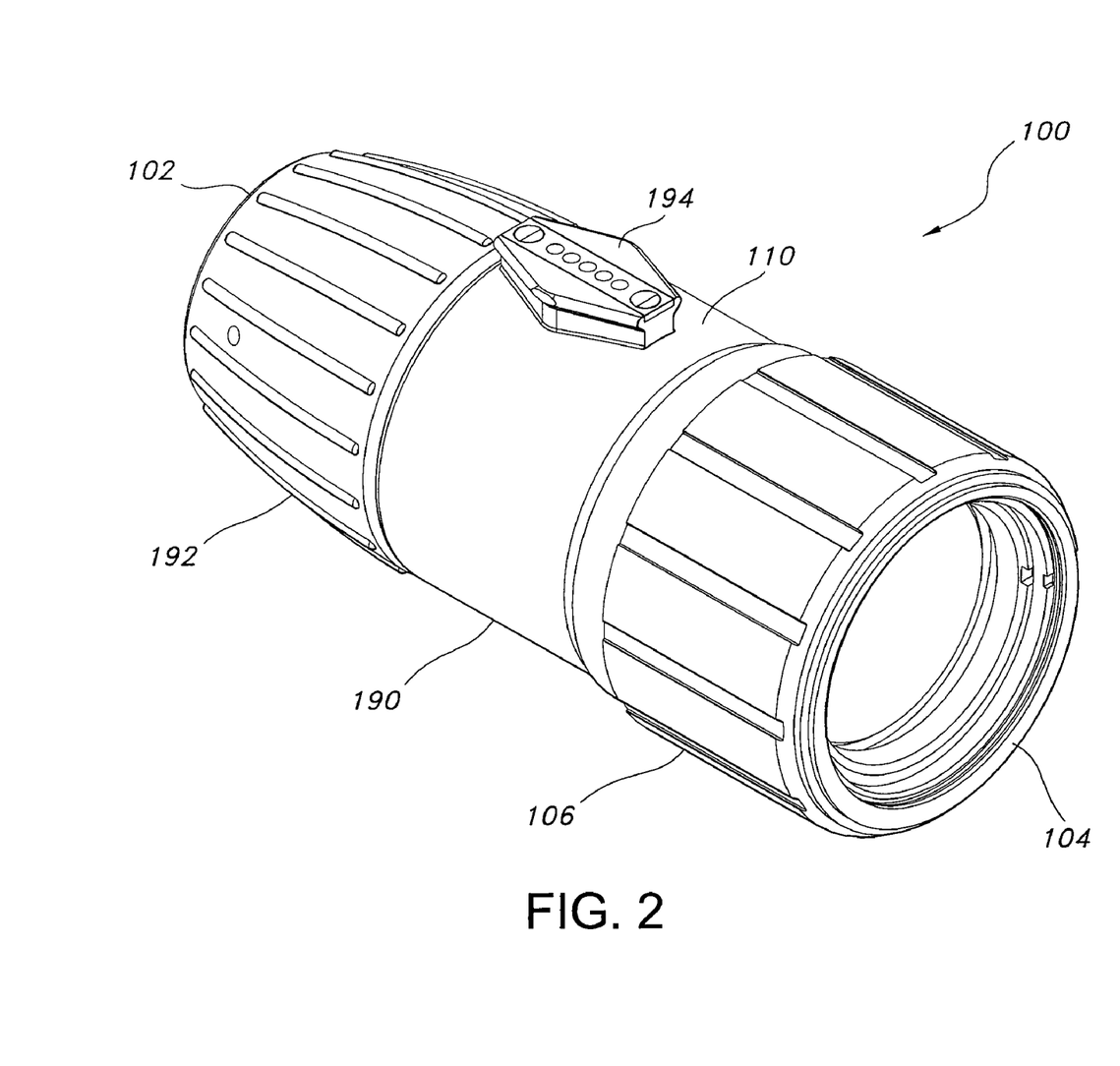
FIG. 2 is a perspective view of the monocular only according to an exemplary embodiment of the present invention.
Figure 3:
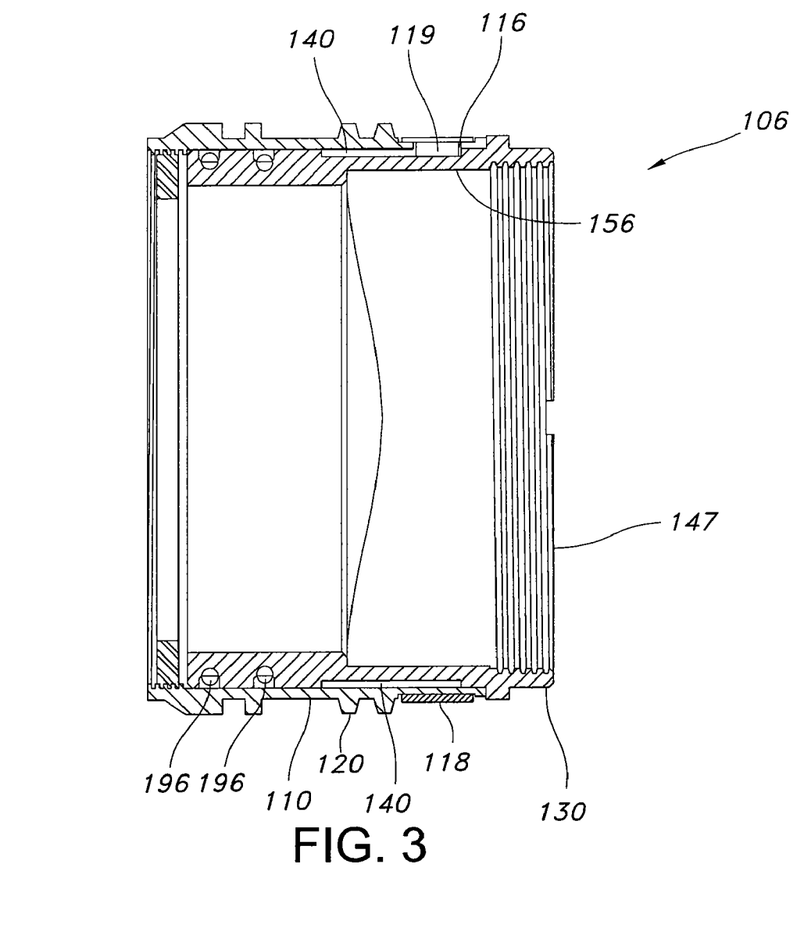
FIG. 3 is a longitudinal side view, in section, of a sleeve of the monocular shown in FIG. 1.

Referring to FIG. 2, monocular 100 is generally tubularly shaped, with an input end 102, which receives light from the external environment, and an output end 104, which transmits the intensified image to a user. The major components of monocular 100 are, from right to left, an eyepiece 106, an image intensifier tube 190 and an objective lens assembly 192, which are all carried in a housing 110.

Figure 4:
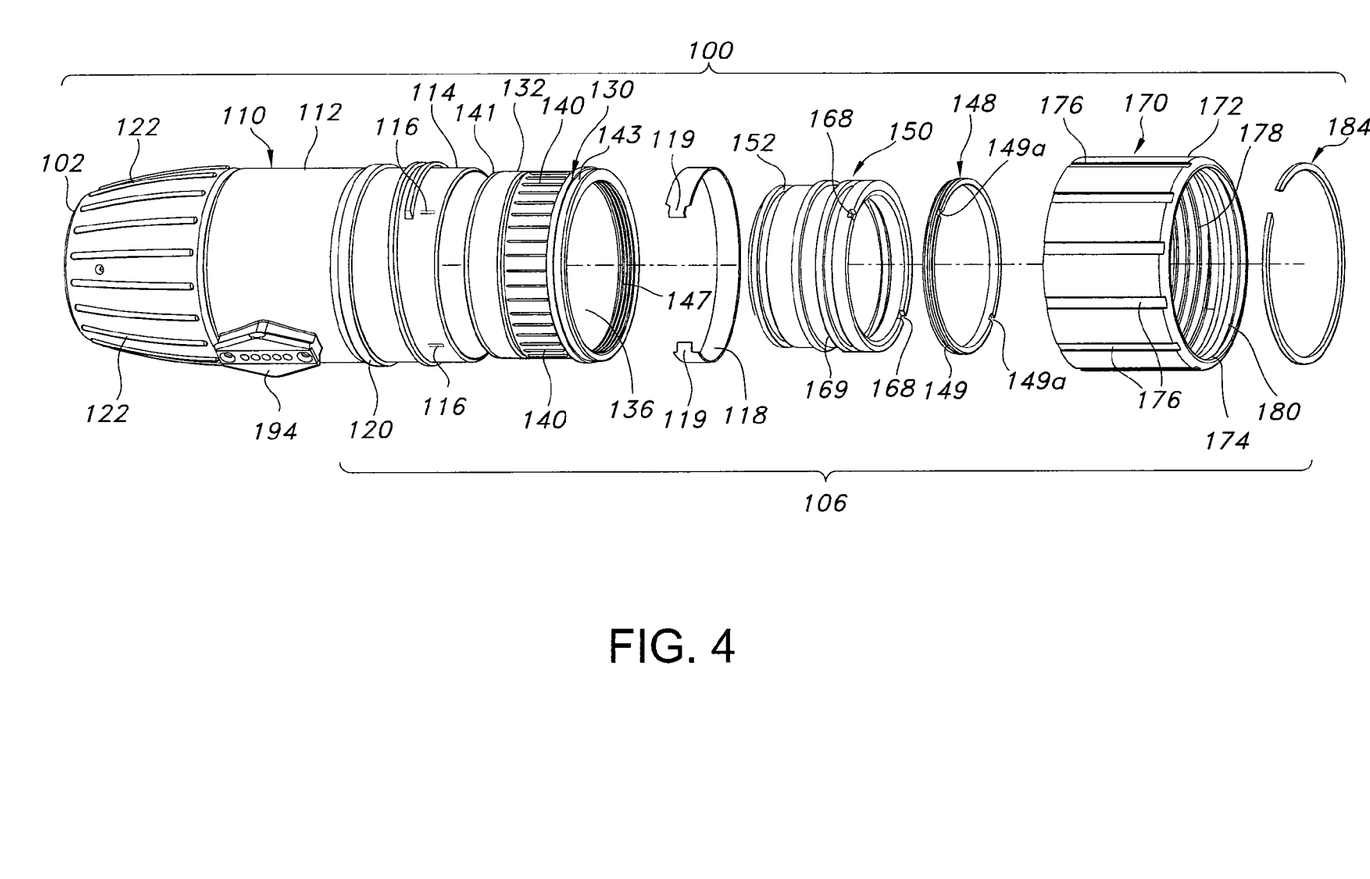
FIG. 4 is an exploded view of eyepiece components of the monocular shown in FIG. 1.
Figure 5:
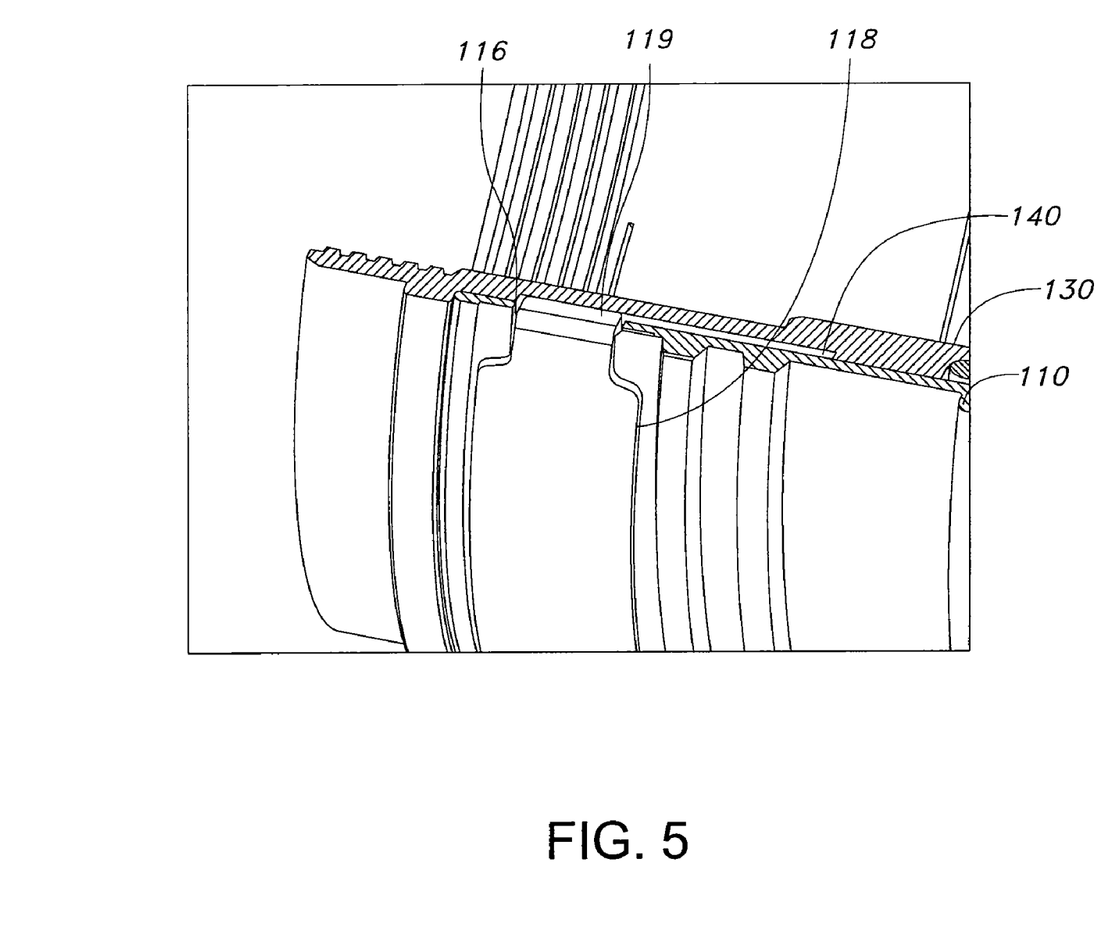
FIG. 5 is a cutaway perspective view of a portion of the eyepiece portion shown in FIG. 3.

Referring to FIG. 4, eyepiece 106 includes an inner, or lens, cell 150 disposed within an outer cell, or sleeve 130, which is partially disposed within housing 110. A focus ring 170 threadably engages housing 110 and is operative to longitudinally translate sleeve 130 and lens cell 150 with respect to housing 110. Such translation may be accomplished without rotating sleeve 130 and lens cell 150 with respect to housing 110. Eyepiece 106 is collimated during fabrication. Therefore, it is desired that sleeve 130 and lens cell 150 do not rotate relative to housing 110 or each other during operation, such as during focusing of eyepiece 106 by the user.

Housing 110 is in the form of a generally tubular or cylindrical body 112. An output end 114 of housing 110 includes two elongated slots 116 formed in body 112. In an exemplary embodiment, slots 116 are spaced from each other about 90 degrees around the outer perimeter or circumference of body 112. Those skilled in the art, however, will recognize that angles greater than or less than 90 degrees may be used. Slots 116 are sized to allow a tang 119 of a clip, such as a clip ring 118, shown in FIGS. 3-6, to be inserted therethrough to engage eccentric sleeve 130, as will be described later in detail herein. Referring to FIG. 4, housing 110 also includes a thread 120 formed on the outer surface of body 112 to threadably engage focus ring 170. At input end 102, housing 110 includes a plurality of circumferentially spaced ridges 122 that extend generally parallel to each other and longitudinally along the length of input end 102. Ridges 122 assist the user in focusing monocular 100 during use.

Figure 7:
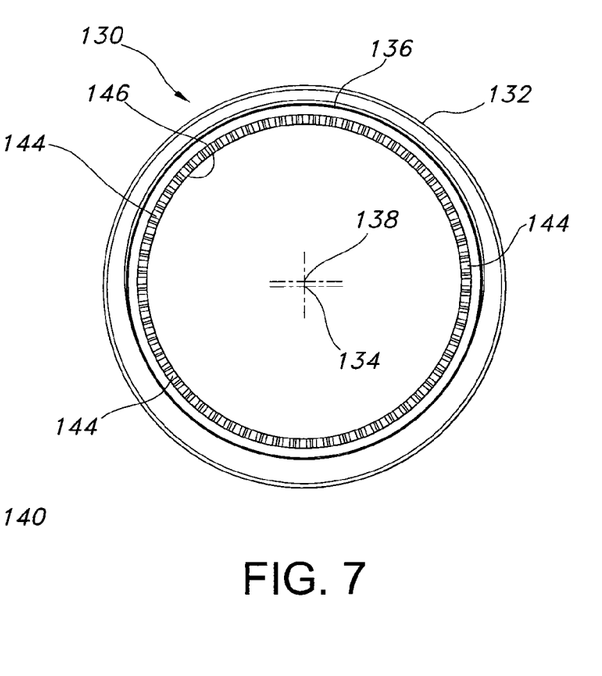
FIG. 7 is a profile view from an output end of the sleeve shown in FIG. 4.

Eccentric sleeve 130 includes a generally cylindrical body defined by an outer surface 132 having a first, or outer, cylinder longitudinal axis 134 that extends perpendicularly out of the plane of the page of FIG. 7, and an inner surface 136 that is eccentrically offset from outer surface 132. Inner surface 136 has a second, or inner, cylinder longitudinal axis 138 that extends perpendicularly out of the plane of the page of FIG. 7. Inner cylinder longitudinal axis 138 is slightly offset from outer cylinder longitudinal axis 134 by a slight distance, such as, for example, approximately 0.5 millimeters, although those skilled in the art will recognize that the offset distance may be more or less than 0.5 millimeters. This offset creates a first eccentricity in sleeve 130 such that, when sleeve 130 is inserted into housing 110 and rotated within housing 110 during fabrication, inner cylinder longitudinal axis 138 shifts relative to outer cylinder longitudinal axis 134.

Figure 8:
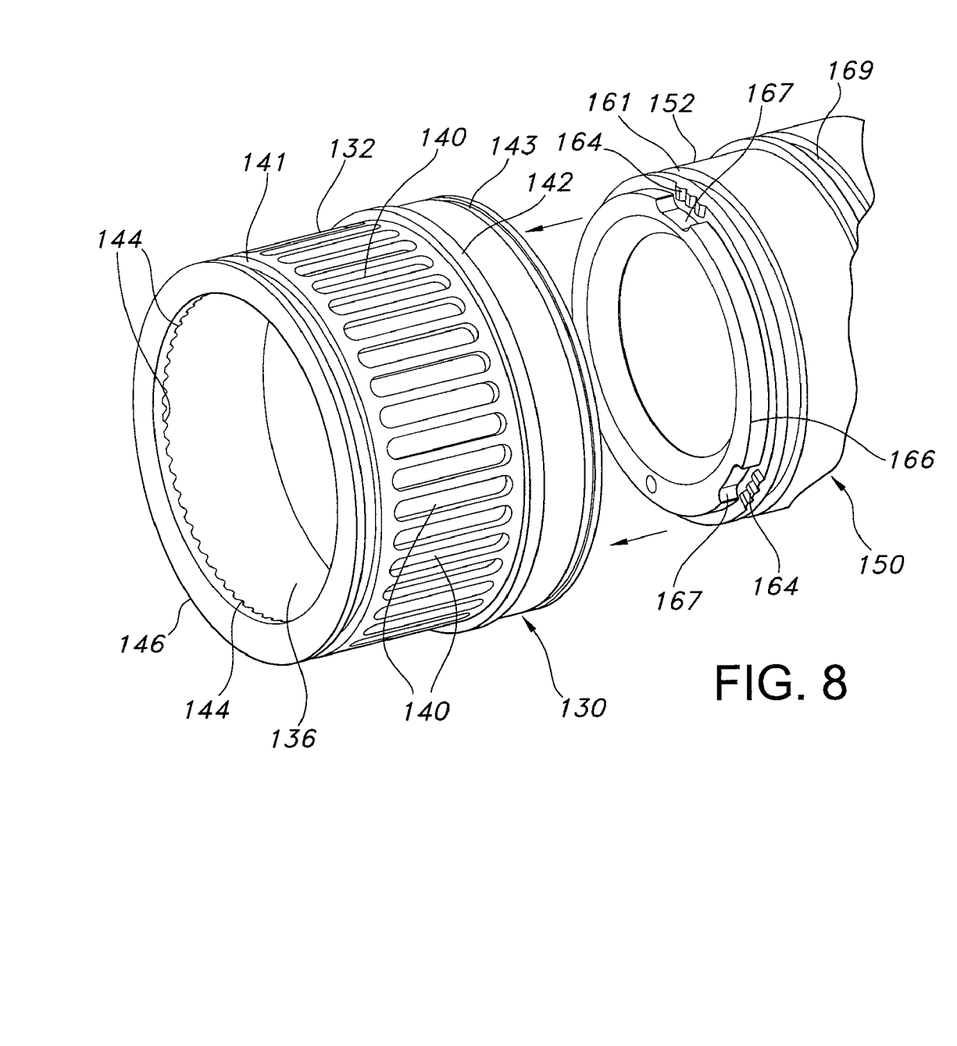
FIG. 8 is a perspective view of a lens cell being inserted into the sleeve.

Referring to FIG. 8, sleeve 130 also includes a series of longitudinal slots 140 that are circumferentially spaced about outer surface 132. In an exemplary embodiment, 40 slots 140 extend, evenly spaced, around outer surface 132. Those skilled in the art, however, will recognize that more or less than 40 slots 140 may be used. Further, slots 140 may be rectangular, oval, oblong, or other shape that allows longitudinal translation of sleeve 130 with respect to housing 110. Slots 140 extend through outer surface 132 to inner surface 136.

Referring back to FIGS. 4-6, clip ring 118 is used to secure housing 110 to sleeve 130 to restrict rotation of sleeve 130 with respect to housing 110. In an exemplary embodiment, clip ring 118 is an elongated piece of beryllium copper that is curved between a first end and a second end. Those skilled in the art, however, will recognize that other materials, such as stainless steel, aluminum, or other suitable material, may be used instead of beryllium copper. The curvature matches the curvature of the exterior of housing 110. Clip ring 118 may have spring properties that enable clip ring 118 to be installed and removed repeatedly on housing 110 without damage. In an exemplary embodiment, clip ring 118 has a length sufficient to extend about 270 degrees around the exterior of housing 110. Clip ring 118 includes tangs 119 that extend from each of the first and second end of clip ring 118, generally toward a radial center of clip ring 118. Those skilled in the art will recognize that clip ring 118 may extend more or less than 270 degrees around the exterior of housing 110, so long as clip ring 118 is sufficiently long to allow tangs 119 to be inserted into elongated slot 116 as described below.

Figure 6:
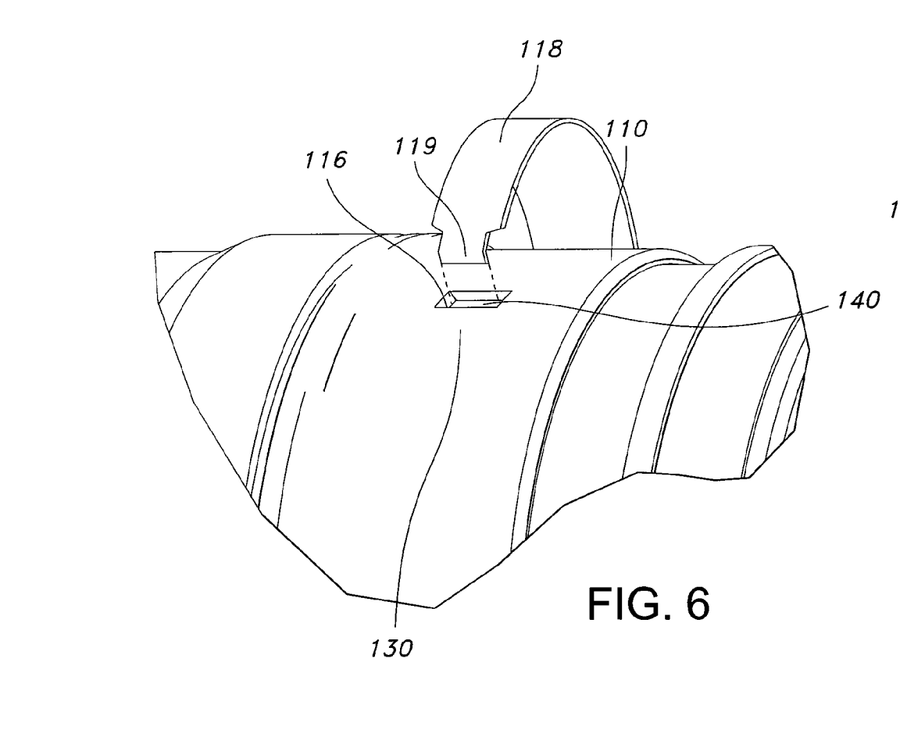
FIG. 6 is a perspective view of a connection between a housing and sleeve of the eyepiece shown in FIG. 4.

Slots 140 are sized to accept and retain tang 119 with a sliding fit. As shown in FIG. 6, when sleeve 130 is inserted into housing 110, sleeve 130 is aligned with housing 110 such that a selected one of slots 140 is aligned with each elongated slot 116. Each tang 119 is insertable through elongated slot 116 and into selected slot 140 so that tang 119 is inserted into the selected slot 140. Slots 140 are longer than the width of tang 119 to allow sleeve 130 to translate axially within housing 110 into which each tang 119 is inserted. Such axial translation allows focusing of monocular 100 for an individual user. In addition to restricting rotation of sleeve 130 with respect to housing 110, clip ring 118 also serves as a mechanical stop for the axial translation of sleeve 130 with respect to housing 110.

Referring to FIGS. 4 and 8, outer surface 132 includes a groove 141 that extends circumferentially around an output end of sleeve 130. Groove 141 is sized to accept and retain an o-ring (not shown) to seal a joint between outer surface 132 and housing 110 during assembly of monocular 100. Outer surface 132 also includes a lip 142 that engages focus ring 170 such that rotation of focus ring 170 longitudinally translates sleeve 130 relative to housing 110.

Outer surface 132 further includes a groove 143 that extends circumferentially around an input end of sleeve 130. Groove 143 is sized to accept and retain a snap ring 184 inserted therein. Snap ring 184 secures focus ring 170 against lip 142.

Referring just to FIG. 8, inner surface 136 of sleeve 130 also includes a plurality of teeth 144 that extend radially around an input lip 146 that extends inwardly from inner surface 136 toward inner cylinder longitudinal axis 138. A plurality of teeth 144 engage a plurality of mating teeth on lens cell 150, as will be described in detail later herein.

Referring back to FIG. 4, inner surface 136 of sleeve 130 also includes an internal thread 147 that receives a locking ring 148. Locking ring 148 biases lens cell 150 against sleeve 130 and transmits longitudinal motion of sleeve 130 to lens cell 150 during focusing. Locking ring 148 includes an external thread 149 that engages internal thread 147 of inner surface 136. The output end of locking ring 148 also includes a pair of diametrically opposed slots 149a that are used to insert locking ring 148 into sleeve 130. An insertion tool (not shown) engages slots 149a. The insertion tool is rotated, thus rotating locking ring 148 and threading locking ring 148 onto sleeve 130.

Figure 9:
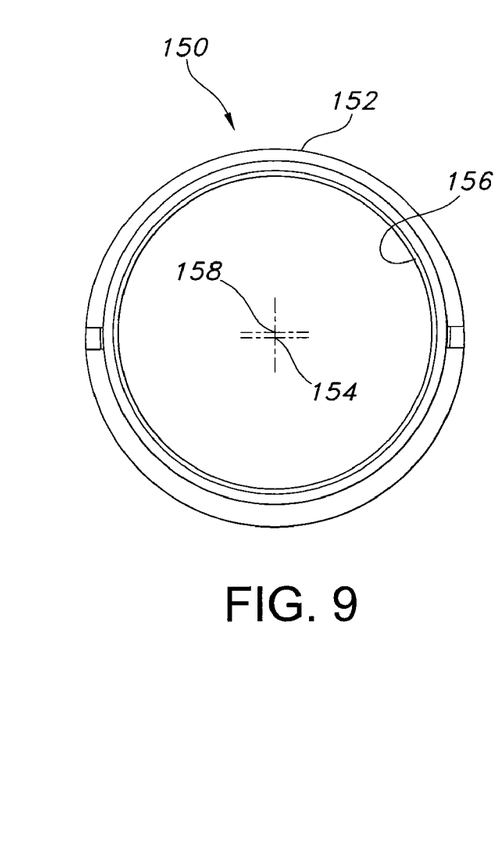
FIG. 9 is a profile view from an output end of the lens cell.

Referring now to FIG. 9, lens cell 150 includes a generally cylindrical body defined by an outer surface 152 having a lens cell central longitudinal axis 154 that extends perpendicularly out of the plane of the page of FIG. 9, and an inner surface 156 that is eccentrically offset from outer surface 152. Inner surface 156 has an optical axis 158 that extends perpendicularly out of the plane of the page of FIG. 9. Optical axis 158 is slightly offset from lens cell central longitudinal axis 154 by a slight distance, such as, for example, approximately 0.5 millimeters, although those skilled in the art will recognize that the offset distance may be more or less than 0.5 millimeters. This offset creates a second eccentricity in lens cell 150 such that, when lens cell 150 is inserted into sleeve 130 and rotated within sleeve 130 during fabrication, optical axis 158 shifts relative to lens cell central longitudinal axis 154.

Lens cell 150 includes a plurality of lenses (not shown) disposed within inner surface 156. While a plurality of lenses may be used, those skilled in the art will recognize that a single lens may be used instead. Combined with the first eccentricity in sleeve 130, optical axis 158 can be manipulated about outer cylinder axes 134, 154 until optical axis 158 is collimated with the rest of monocular 100.

Referring back to FIG. 8, outer surface 152 includes a groove 161 that extends circumferentially around an input end of lens cell 150. Groove 161 is sized to accept and retain an o-ring (not shown) to seal a joint between outer surface 152 and sleeve 130 during assembly of monocular 100. A portion of the input end of lens cell 150 also includes a plurality of mating teeth 164 that engage teeth 144 on sleeve 130. Teeth 164 may be arranged in three sets that are circumferentially arranged around the input end of lens cell 150. Those skilled in the art, however, will recognize that more or less than three sets of teeth 164 may be spaced around the input end of lens cell 150. A lip 166 extends longitudinally away from the input end. Lip 166 includes a plurality of cutouts 167, with each cutout 167 spaced adjacent a set of teeth 164. Cutouts 167 are formed to assist in cutting teeth 164 during manufacture.

Referring back to FIG. 4, the output end of lens cell 150 also includes a pair of diametrically opposed slots 168 formed therein. Slots 168 are sized to accept an insertion tool (not shown) to assist in inserting lens cell 150 into sleeve 130 during assembly. A groove 169 is formed in outer surface 152 between groove 161 and teeth 164. Groove 169 is sized to accept and retain an o-ring (not shown) to seal a joint between outer surface 152 and sleeve 130 during assembly of monocular 100.

Focus ring 170 includes a generally annular body defined by an outer surface 172 and an inner surface 174. Outer surface 172 includes a plurality of circumferentially spaced longitudinal grooves 176. Grooves 176 enable a user to grip focus ring 170 and rotate focus ring 170 to focus eyepiece 106 during use.

Inner surface 174 of focus ring 170 includes a threaded formation 178 that engages external thread 120 on housing 110. Inner surface 174 also includes a groove 180 that is sized to accept and retain an o-ring (not shown) to seal a joint between inner surface 174 and sleeve 130.

Snap ring 184 is used to secure focus ring 170 against sleeve 130. Snap ring 184 snaps into groove 143 in sleeve 130 and secures focus ring 170 against lip 143 of sleeve 130.

Referring back to FIG. 2, image intensifier 190 is located within housing 110 and includes all of the optics, electronics and associated devices to operate image intensifier 190. Objective lens assembly 192 is partially located within housing 110, between image intensifier 190 and input end 102. Image intensifier 190 and objective lens assembly 192 can be any known apparatus and need not be described in detail. A power connector 194 extends outwardly from housing body 112. Power connector 194 electrically connects image intensifier 190 to a power source (not shown). Power connector 194 also releasably physically connects monocular 100 to a support, such as for binoculars or a weapon sight.

To assemble eyepiece 106, image intensifier 190 and objective lens assembly 192 are inserted into monocular 100 according to known methods. Reference is made to the flow chart 300 of FIG. 10 for steps in the assembly process. In step 302, lens cell 150 is partially inserted into sleeve 130 as shown in FIG. 8 so that mating teeth 164 of lens cell 150 engage teeth 144 of sleeve 130. In step 304, the combined sleeve 130 and lens cell 150 are then inserted into housing 110. In step 306, sleeve 130 and lens cell 150 are independently rotated relative to each other and to housing 110 in order to collimate monocular 100. The eccentricity of optical axis 158 with respect to lens cell central longitudinal axis 154 of lens cell 150, as well as the eccentricity of outer cylinder longitudinal axis 134 relative to inner cylinder longitudinal axis 138 of sleeve 130, allows sleeve 130 and lens cell 150 to be rotated relative to housing 110 until optical axis 158 is collimated with image intensifier 190 and objective lens assembly 192. Teeth 144 and mating teeth 164 are ramped to allow indexing during collimation. In the event that teeth 164, 144 do not perfectly align to retain perfect collimation, lens cell 150 may be indexed relative to sleeve 130 to obtain a mating engagement between teeth 164, 144, while only slightly distorting the collimation of eyepiece 106. In step 308, when a desired relationship between teeth 164, 144 is made, sleeve 130 and lens cell 150 are coupled together by engaging teeth 164 with teeth 144.

Figure 10:
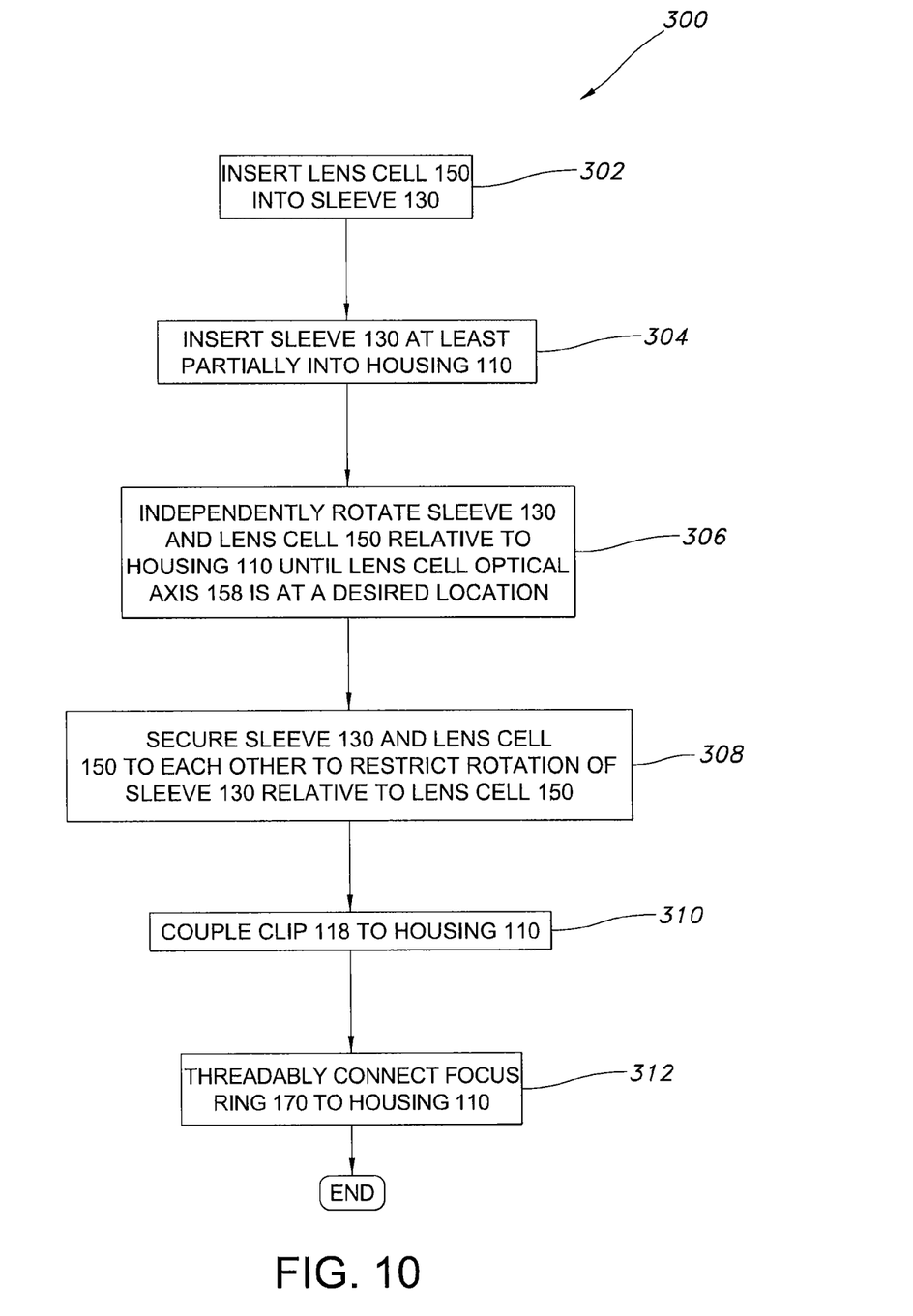
FIG. 10 is a flow chart illustrating steps for manufacturing the monocular of FIG. 2.
Figure 11:
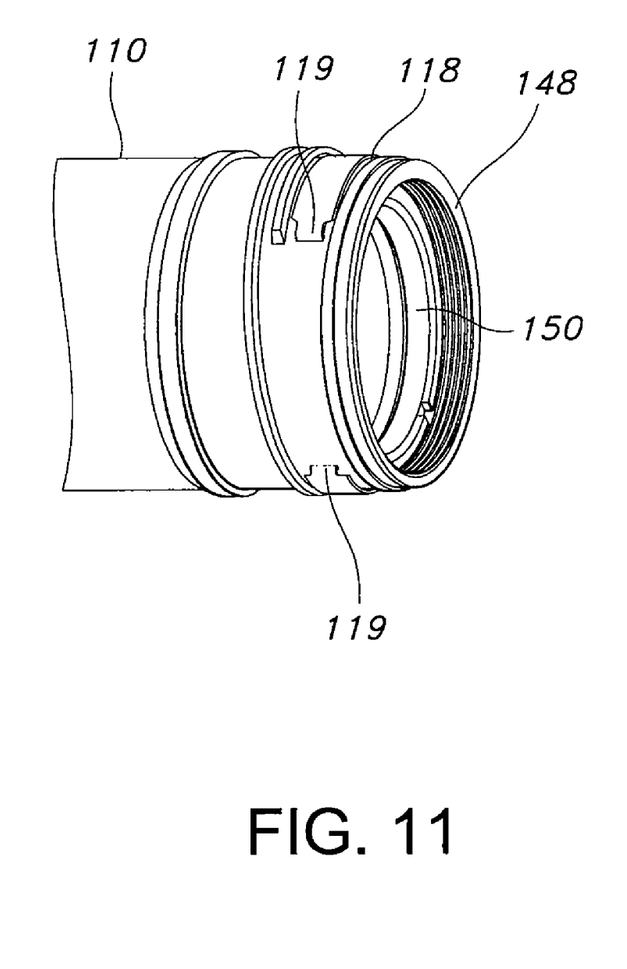
FIG. 11 is a perspective view of the assembled monocular of FIG. 2, with the focus ring removed.

Next, sleeve 130 is aligned with housing 110 such that a selected slot 140 is aligned with each elongated slot 116. When a slot 140 is aligned with one of elongated slots 116, another slot 140 will be aligned with the remaining elongated slot 116. In step 310, clip ring 118 is coupled to housing 110 and to sleeve 130 by inserting one of tangs 119 into one of elongated slots 116 and slot 140 that is aligned with elongated slot 140, and by inserting the other tang 119 into the other elongated slot 116 and the other slot 140 that is aligned with the other elongated slot 116. Clip 118 extends around at least a portion of housing 110, as shown in FIG. 11.

In the event that slots 140 and elongated slot 116 do not perfectly align to retain perfect collimation, clip ring 118 may be removed and sleeve 130 may be indexed relative to housing 110 to obtain alignment between slots 140 and elongated slots 116, while only slightly distorting the collimation of eyepiece 106. Clip ring 118 may then be reinserted into selected slots 140 as described above. Once optical axis 158 is collimated, lock ring 148 is threaded onto sleeve 130 to secure lens cell 150 against sleeve 130.

In step 312, focus ring 170 is next threaded onto housing 110. Snap ring 184 is snapped into groove 143 and secures lip 182 of focus ring 170 against lip 142 of sleeve 130 so that translation of focus ring 170 caused by the threaded connection of focus ring 170 with housing 110 is transferred to sleeve 130 and lens cell 150 without rotation of sleeve 130 or lens cell 150, allowing for longitudinal translation of sleeve 130 with respect to housing 110.

Monocular 100 may be part of a helmet-mounted or hand-held night vision system. Alternatively, monocular 100 may be used as a sight for a weapon system, such as a rifle or even a tank. Further, monocular 100 may be incorporated into any optical system requiring focusing and collimation.

Referring back to FIG. 1, a second monocular 200 is used in conjunction with monocular 100 to form binocular 210. Second monocular 200 may be structurally similar to monocular 100. First and second monoculars 100, 200 are releasably connected to a binocular frame 212 through power connector 194, not shown in FIG. 1, on each monocular 100, 200. In the event that one of monoculars 100, 200 needs to be repaired or replaced, that monocular is removed from binocular frame 212 and repaired or replaced. When the repaired or replacement monocular is connected to binocular frame 212, the repaired or replaced monocular does not need to be collimated with the original monocular.

Although the invention is illustrated and described herein with reference to a specific embodiment, the invention is not intended to be limited to the details shown. Rather, various modifications may be made in the details within the scope and range of equivalents of the claims and without departing from the invention. While exemplary embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

What is claimed:

1. An optical system comprising:
   a lens cell having a generally cylindrical lens cell body and an optical lens system therein, wherein the lens cell body has a lens cell central longitudinal axis and a lens cell optical axis eccentrically offset from the lens cell central longitudinal axis;
   a sleeve having a generally cylindrical sleeve body, wherein the sleeve body has an outer surface with a first longitudinal axis and an inner surface with a second longitudinal axis eccentrically offset from the first longitudinal axis, wherein the lens cell is inserted into the sleeve;
   a housing having a generally cylindrical body, wherein the sleeve is at least partially inserted into the housing, and
   a clip disposed about at least a portion of the circumference of the housing,
   wherein the lens cell and the sleeve are rotated relative to each other and to the housing such that the lens cell optical axis is aligned in a desired location, and wherein, after the lens cell optical axis is aligned in the desired location, the clip is releasably coupled to and inserted through the housing and into the sleeve to restrict rotation of the sleeve relative to the housing, and
   the clip comprises an elongated curved body with a first end and a second end, and having a tab extending from each end thereof, the tabs being sized to engage the sleeve through the housing.

2. The optical system according to claim 1, wherein the lens cell body comprises a plurality of locking members and wherein the sleeve body comprises a plurality of mating members engaged with the plurality of locking members to restrict rotation of the lens cell relative to the sleeve.

3. The optical system according to claim 1, wherein the outer surface of the sleeve body comprises a plurality of slots circumferentially spaced therearound and wherein the clip extends through the housing and into one of the plurality of slots to connect the housing and the sleeve together.

4. The optical system according to claim 1, wherein the housing comprises at least one elongated opening therein, and wherein each of the tabs extends through one of the at least one elongated opening.

5. The optical system according to claim 4, wherein the plurality of slots may be indexed relative to the at least one elongated opening.

6. The optical system according to claim 1, wherein the sleeve is longitudinally translatable relative to the housing.

7. The optical system according to claim 1, further comprising a focus ring threadably connected to the housing.

8. A monocular comprising:
   the optical system of claim 1;
   a lens assembly; and
   an image intensifier disposed between the lens assembly and the eyepiece.

9. An optical system comprising:
   an inner cell having an inner cell central longitudinal axis and an inner cell optical axis, eccentrically offset from the inner cell central longitudinal axis;
   an outer cell having a generally cylindrical cell body, wherein the cell body has an outer surface with a first longitudinal axis and an inner surface with a second longitudinal axis eccentrically offset from the first longitudinal axis, wherein the inner cell is inserted into the outer cell;
   a housing having a generally cylindrical body defining a perimeter thereof, wherein the outer cell is at least partially inserted into the housing, and
   a clip disposed about at least a portion of the perimeter of the housing,
   the clip comprises an elongated curved body with a first end and a second end, and having a tab extending from each end thereof, the tabs being sized to engage the sleeve through the housing,
   wherein the inner cell and the outer cell are rotated relative to each other and to the housing such that the inner cell optical axis is aligned in a desired location, and wherein, after the inner cell optical axis is aligned in the desired location, the clip is releasably coupled to and inserted through the housing and into the outer cell to restrict rotation of the outer cell relative to the housing.

10. The optical system according to claim 9, wherein the housing comprises a pair of longitudinal housing slots having a first length and the second cell comprises a plurality of longitudinal cell slots extending around the perimeter of the outer cell, the longitudinal cell slots having a length greater than a width of the clip inserted into the outer cell.

11. The optical system according to claim 9, wherein the inner cell comprises a lens.

12. A method of manufacturing a collimated optical device comprising the steps of:
   providing a lens cell having a generally cylindrical lens cell body, wherein the lens cell body has a lens cell central longitudinal axis and a lens cell optical axis, offset from the lens cell central longitudinal axis;
   inserting the lens cell into a sleeve, wherein the sleeve comprises a generally cylindrical sleeve body, wherein the sleeve body has an outer surface with a first longitudinal axis and an inner surface with a second longitudinal axis offset from the first longitudinal axis;
   inserting the sleeve at least partially into a housing, wherein the housing comprises a generally cylindrical housing body;
   independently rotating the sleeve and the lens cell relative to the housing until the lens cell optical axis is at a desired location;
   securing the sleeve and the lens cell to each other to restrict rotation of the sleeve relative to the lens cell; and
   coupling a clip to the housing, wherein the clip extends through the housing and engages the sleeve, thereby securing the sleeve to the housing to restrict rotation of the sleeve relative to the housing, wherein securing the sleeve to the housing comprises coupling the clip around at least a portion of the housing and engaging the sleeve.

13. The method according to claim 12, wherein the lens cell body comprises a plurality of locking members and wherein the sleeve body comprises a plurality of mating members, wherein securing the sleeve and the lens cell to each other further comprises engaging the plurality of locking members with the plurality of mating members to restrict rotation of the lens cell relative to the sleeve.

14. The method according to claim 12, wherein securing the sleeve to the housing allows longitudinal translation of the sleeve with respect to the housing.

15. The method according to claim 12, further comprising threadably connecting a focus ring to the housing.

16. A binocular comprising:
a frame;
a first monocular including:
 a lens cell having a generally cylindrical lens cell body and an optical lens system therein, wherein the lens cell body has a lens cell central longitudinal axis and a lens cell optical axis, offset from the lens cell central longitudinal axis;
 a sleeve having a generally cylindrical sleeve body, wherein the sleeve body has an outer surface with a first longitudinal axis and an inner surface with a second longitudinal axis offset from the first longitudinal axis, wherein the lens cell is inserted into the sleeve; and
 a housing having a generally cylindrical housing body, wherein the sleeve is at least partially inserted into the housing,
 a clip disposed about at least a portion of the circumference of the housing,
 wherein the lens cell and the sleeve are rotated relative to each other and to the housing such that the lens cell optical axis is aligned in a desired location, and wherein, after the lens cell optical axis is aligned in the desired location, the clip is releasably coupled to and inserted through the housing and into the sleeve to restrict rotation of the sleeve relative to the housing;
 a second monocular having the same configuration as the first monocular, wherein the first and second monoculars are separately releasably connected to the frame; and
the clip comprises an elongated curved body with a first end and a second end, and having a tab extending from each end thereof, the tabs being sized to engage the sleeve through the housing.

17. The binocular according to claim 16, wherein the lens cell body comprises a plurality of locking members and wherein the sleeve body comprises a plurality of mating members engaged with the plurality of locking members to restrict rotation of the lens cell relative to the sleeve.

18. The binocular according to claim 16, wherein the outer surface of the sleeve body comprises a plurality of slots circumferentially spaced therearound and wherein the clip extends through the housing and into one of the plurality of slots to connect the housing and the sleeve together to restrict rotation of the housing relative to the sleeve.

19. The binocular according to claim 16, wherein the housing comprises at least one elongated slot therein, and wherein a portion of the clip extends through each of the at least one elongated slot.

20. The binocular according to claim 19 wherein the plurality of slots may be indexed relative to the at least one elongated slots.

21. The binocular according to claim 16, wherein the sleeve is longitudinally translatable relative to the housing.

22. The binocular according to claim 16, further comprising a focus ring threadably connected to the housing.

* * * * *